(12) United States Patent
Xie et al.

(10) Patent No.: US 8,602,474 B2
(45) Date of Patent: Dec. 10, 2013

(54) ROBOT CLAW

(75) Inventors: Yong Xie, Shenzhen (CN); Xiao-Bin Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/533,974

(22) Filed: Jun. 27, 2012

(65) Prior Publication Data

US 2013/0082476 A1   Apr. 4, 2013

(30) Foreign Application Priority Data

Sep. 30, 2011   (CN) .......................... 2011 1 0297466

(51) Int. Cl.
*B25J 15/10* (2006.01)
(52) U.S. Cl.
USPC ........... 294/207; 294/192; 294/119.1; 901/30
(58) Field of Classification Search
USPC ........... 294/119.1, 207, 192, 202, 103.1, 902; 269/34, 37, 43, 118, 152; 901/30, 31, 901/32, 36, 39
See application file for complete search history.

(56) References Cited

U.S. PATENT DOCUMENTS

| 4,479,673 | A | * | 10/1984 | Inaba et al. | 294/207 |
| 4,699,414 | A | * | 10/1987 | Jones | 294/119.1 |
| 4,987,676 | A | * | 1/1991 | Amorosi | 901/40 |
| 6,494,516 | B1 | * | 12/2002 | Bertini | 294/207 |
| 6,547,258 | B2 | * | 4/2003 | Mandokoro et al. | 294/119.1 |
| 7,562,923 | B2 | * | 7/2009 | Han et al. | 294/119.1 |

* cited by examiner

*Primary Examiner* — Paul T Chin
(74) *Attorney, Agent, or Firm* — Altis Law Group, Inc.

(57) ABSTRACT

A robot claw includes a base seat, more than one elastic assemblies, and at least two first clamping assemblies. The base seat includes a first fastening surface and a second fastening surface opposite to the first fastening surface. Each first clamping assembly includes a sliding unit fastened to the first fastening surface of the base seat and a clamping member fastened to the sliding unit. The sliding unit includes a guide rail. Two elastic assemblies are loaded at two opposite ends of each guide rail; when each of the clamping member slides to one end thereof, one elastic assembly elastically resists with an air cylinder to drive the air cylinder with the clamping member to slide towards the other end of the guide rail of the sliding unit.

8 Claims, 4 Drawing Sheets

ROBOT CLAW

BACKGROUND

1. Technical Field

The present disclosure generally relates to robot claws, and particularly to a robot claw for industrial automation.

2. Description of Related Art

A robot claw may clamp a workpiece and fasten the workpiece to a particular location of a machine table for machining the workpiece. After the workpiece has been machined, the robot claw again clamps the workpiece to remove the workpiece. However, if a workpiece must be intricately loaded in a tray in a very specific or particular orientation and the clamping accuracy of the robot claw cannot be adjusted, it is difficult for a robot claw to clamp the workpiece and hold it steadily on the machine table.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
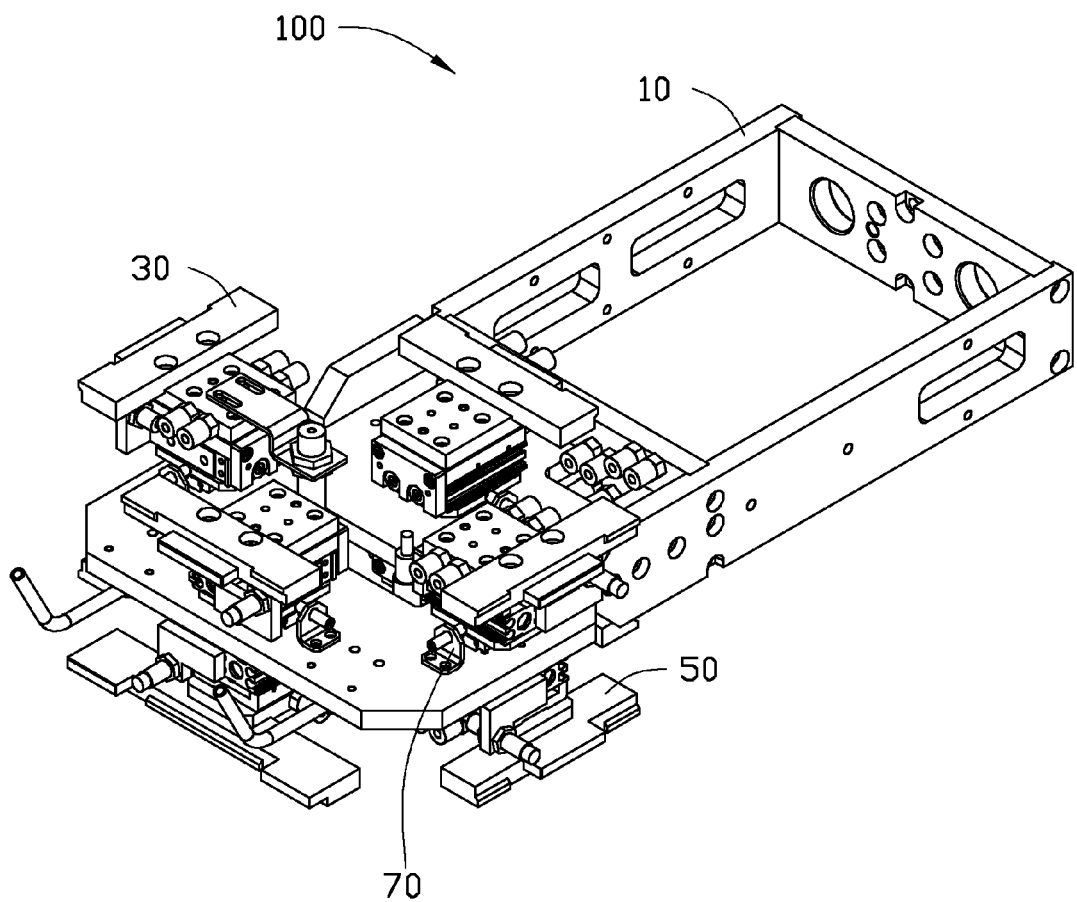
FIG. 1 is an isometric, assembled view of an embodiment of a robot claw.
Figure 2:
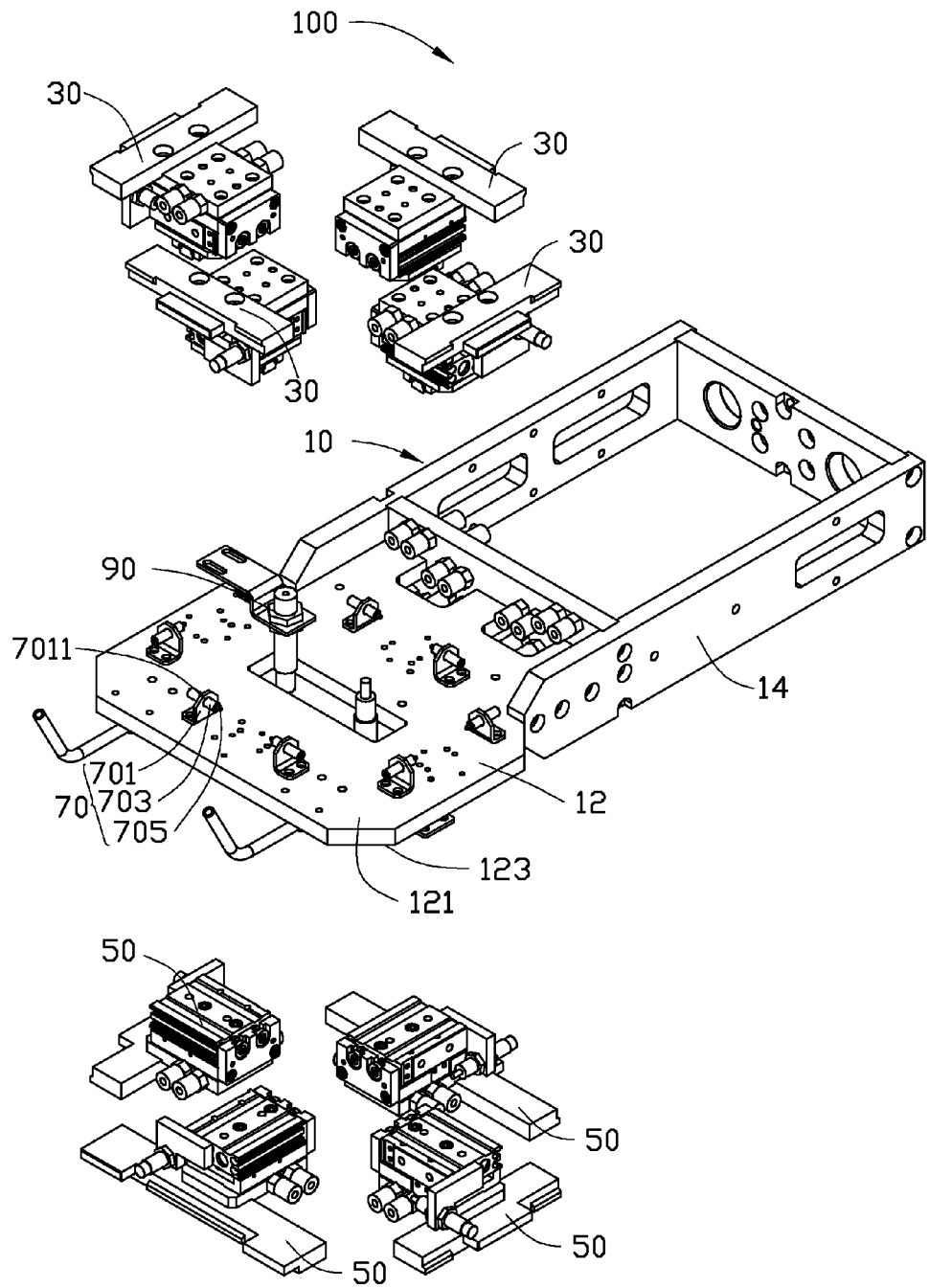
FIG. 2 is an exploded, isometric view of the robot claw of FIG. 1.
Figure 3:
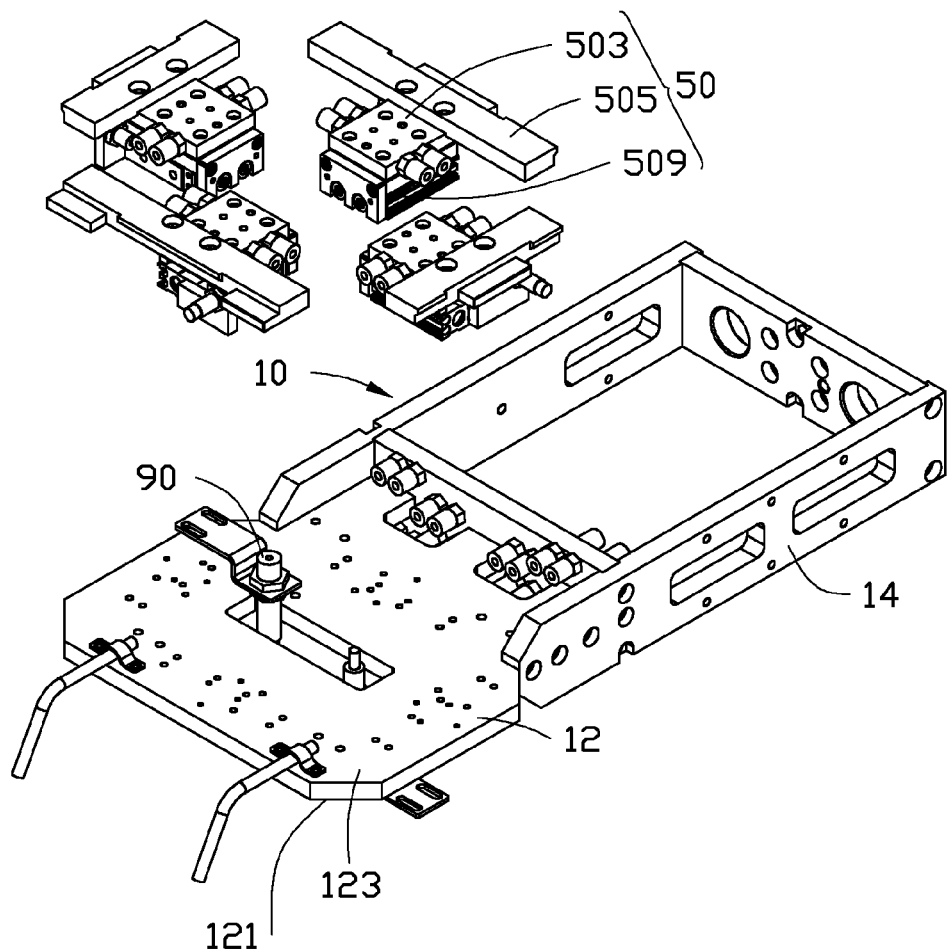
FIG. 3 is similar to FIG. 2, but viewed from another aspect.

FIGS. 1 through 3, show that a robot claw 100 includes a base seat 10, four first clamping assemblies 30, eight elastic assemblies 70, and four second clamping assemblies 50. The four first clamping assemblies 30 and the eight elastic assemblies 70 are fastened on one surface of the base seat 10, and the four second clamping assemblies 50 are fastened on the other surface of the base seat 10. In the illustrated embodiment, the robot claw 100 is used for clamping a workpiece (not shown) defining a clamping groove at the outer surface of the workpiece, and each of the four first clamping assemblies 30 or the four second clamping assemblies 50 utilizes one sidewall of the clamping groove of the workpiece to clamp the workpiece.

The base seat 10 includes a fastening board 12 and a fastening frame 14 connected to the fastening board 12. The fastening board 12 is a substantially rectangular board, and includes a first fastening surface 121 and a second fastening surface 123 opposite to the first fastening surface 121. In the illustrated embodiment, the workpiece to be clamped by the robot claw 100 is substantially rectangular, and defines a rectangular clamping groove in the outer surface thereof. The four first clamping assemblies 30 or the four second clamping assemblies 50 are positioned and configured at the four edges of the fastening board 12 to correspond to the shape of the rectangular clamping groove of the workpiece, respectively. In alternative embodiments, the number of the first clamping assemblies 30 or the second clamping assemblies 50 can be two, or three or more for facilitating the clamping of the workpiece.

Figure 4:
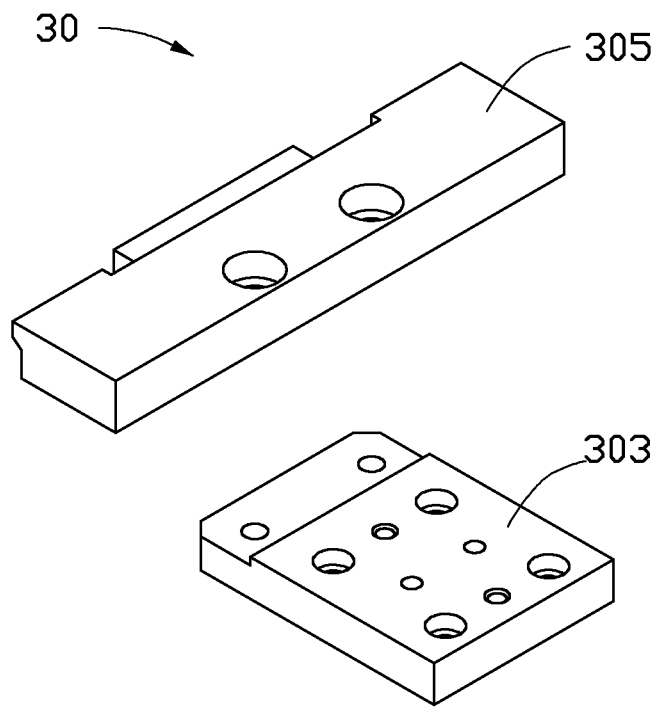
FIG. 4 is an exploded, isometric view of the clamping assembly of FIG. 1.
Figure 4:
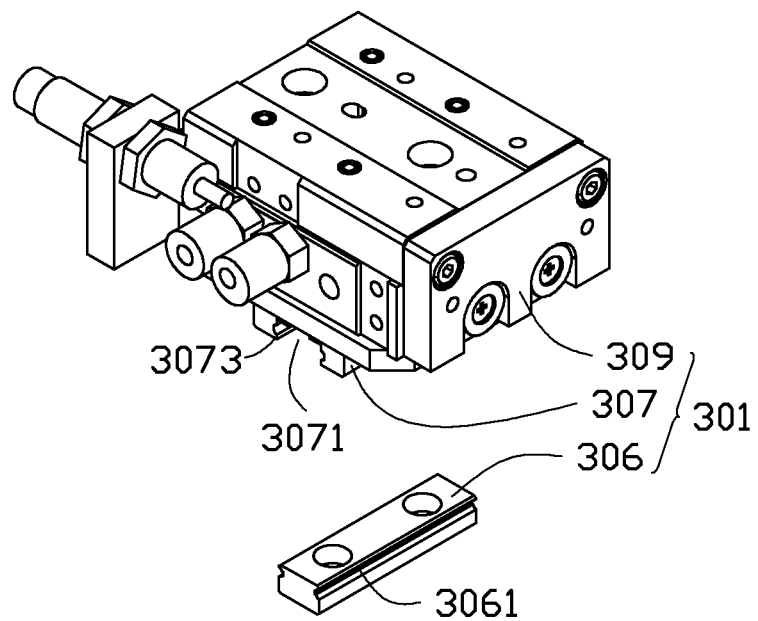

Referring to FIG. 4, each of the four first clamping assemblies 30 includes a sliding unit 301 fastened on the first fastening surface 121 of the fastening board 12, a fastening member 303 fastened to the sliding unit 301, and a clamping member 305 fastened to the fastening member 303.

The sliding unit 301 includes a guide rail 306, a sliding member 307, and an air cylinder 309. In the illustrated embodiment, the guide rail 306 is substantially rectangular, and is fastened on the first fastening surface 121 of the fastening board 12. The guide rail 306 defines two sliding grooves 3061 at opposite sides thereof. The sliding member 307 defines a latching groove 3071 at a surface thereof adjacent to the guide rail 306, and two latching arms 3073 are formed on opposite inner surfaces of the latching groove 3071. The sliding member 307 is capable of sliding along the guide rail 306 with each of the two latching arms 3073 latching in one sliding groove 3061. The air cylinder 309 drives the sliding member 307 to slide along the guide rail 306. and is fastened to the sliding member 307 away from the guide rail 306.

In alternative embodiments, the guide rail 306 can be integrally formed on the first fastening surface 121 of the fastening board 12. The guide rail 306 can be also a sliding groove defined in the first fastening surface 121, and the sliding member 307 can be a simple flange fastened to the air cylinder 309.

The fastening member 303 is a substantially rectangular board, and fastened to a flat surface of the air cylinder 309 away from the sliding member 307. In the illustrated embodiment, the fastening member 303 is used to fasten the clamping member 305 and other components (not shown). The clamping member 305 is a substantially rectangular board, and is fastened to the fastening member 303 away from the air cylinder 309.

In alternative embodiments, the fastening member 303 can be omitted, and the clamping member 305 is fastened to the air cylinder 309.

Referring to FIG. 2 again, each of the eight elastic assemblies 70 includes a connecting member 701 fastened on the fastening board 12, a sleeve 703 fastened to the connecting member 701, and an elastic member 705 fastened to an end of the sleeve 703. The connecting member 701 is a substantially L-shaped brace or bracket. One end of the connecting member 701 is fastened to the first fastening surface 121 of the fastening board 12. The connecting member 701 defines a fastening hole 7011 at the other end of the connecting member 701. The sleeve 703 is fastened in the fastening hole 7011. One end of the elastic member 705 is fastening in the sleeve 703, and the other end of the elastic member 705 provides an elastic resistance to the air cylinder 309. In the illustrated embodiment, a pair of elastic assemblies 70 are fastened at opposite ends of each of the four guide rails 306 at each edge of the fastening board 12. When each of the clamping member 305 slides to one end of the guide rails 306, one elastic assembly 70 interacts with the air cylinder 309 to drive the air cylinder 309 with the clamping member 305 to slide towards the other end of the guide rail 306. When each of the first clamping assembly 30 slides to the other end of the guide rail 306, another elastic assembly 70 interacts with the air cylinder 309 to drive the air cylinder 309 with the clamping member 305 to slide towards the opposite end of the guide rail 306.

In alternative embodiments, the sleeve 703 can be omitted, and the elastic member 705 is fastened to the air cylinder 309.

Each of the four second clamping assemblies 50 includes a fastening member 503, a clamping member 505, and an air cylinder 509. The air cylinder 509 is fastened on the second fastening surface 123 of the fastening board 12, the fastening member 503 is fastened to the air cylinder 509, and the clamping member 505 is fastened to the fastening member 503. In alternative embodiments, if the four clamping members 505 do not require to move, the four air cylinders 509 can be omitted, and each of the four fastening members 503 may be fastened on the second fastening surface 123. In addition, the fastening member 503 can be also omitted, and each of the four clamping member 505 may be fastened on the second fastening surface 123.

The robot claw 100 further includes a position sensor 90. The position sensor 90 is located at the first fastening surface 121, and is connected to a control module (not shown) for controlling the robot claw 100. The position sensor 90 can sense a distance between the position sensor 90 and the workpiece to be clamped by the robot claw 100 and send the data as to the distance to the control module, to control the movement of the air cylinder 509.

In use, the robot claw 100 drives the four first clamping assemblies 30 to move into the clamping groove of the workpiece, and each of the air cylinder 309 drives one clamping member 305 to move horizontally, to adjust the position of the clamping member 305. When the position sensor 90 senses a preset distance between a sensing point of the workpiece and the position sensor 90, each of the air cylinder 309 stops moving, the robot claw 100 will clamp and move the workpiece to a machine table (not shown), and fasten the workpiece to a certain or particular location of the machine table. Then the air cylinders 309 stops moving. As one elastic member 705 is located at an end of each of the air cylinder 309 and resisting the air cylinder 309, each of the air cylinders 309 with the clamping member 305 will move back to its original position. After the workpiece has been machined, the robot claw 100 rotates at an angle of 180°, and the workpiece is re-clamped and moved away by using the four second clamping assemblies 50.

In alternative embodiments, the four second clamping assemblies 50 can be omitted, and the workpiece can be clamped and moved away by the four first clamping assemblies 30.

In summary, the position of each of the clamping members 305 of the four first clamping assemblies 30 in the robot claw 100 can be adjusted to accurately clamp a workpiece, and each of the four first clamping assemblies 30 can be moved back to its original position driven by one elastic assembly 70, which will increase the clamping accuracy and the working efficiency of the robot claw 100.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A robot claw comprising:
a base seat comprising a first fastening surface and a second fastening surface opposite to the first fastening surface;
at least two elastic assemblies fastened on the first fastening surface; and
at least two first clamping assemblies fastened on the first fastening surface, wherein each of the at least two first clamping assemblies comprises a sliding unit fastened to the first fastening surface of the base seat and a clamping member fastened to the sliding unit, the sliding unit comprises a guide rail fastened to the first fastening surface, a sliding member slidably engaging with the guide rail, and an air cylinder fastened to the sliding member to drive the sliding member to slide along the guide rail, the clamping member is fastened to the air cylinder, and one elastic assembly is positioned at an end of each of the guide rails, when the sliding member slides along at an end of the guide rail adjacent to the elastic assembly, the elastic assemblies elastically resist with the air cylinder.

2. The robot claw of claim 1, wherein the guide rail defines two sliding grooves at opposite sides thereof, the sliding member defines a latching groove, two latching arms are formed on opposite inner surfaces of the latching groove, and each of the two latching arms latches in one sliding groove.

3. The robot claw of claim 1, wherein each of the at least two elastic assemblies comprises a connecting member fastened to the first fastening surface, a sleeve fastened to a distal end of the connecting member, and an elastic member fastened to a distal end of the sleeve away from the connecting member.

4. The robot claw of claim 3, wherein the connecting member is an L-shaped brace, one end of the connecting member is fastened to the first fastening surface, the connecting member defines a fastening hole at the other end thereof, and the sleeve is fastened in the fastening hole.

5. The robot claw of claim 1, further comprises at least two second clamping assemblies fastened to the second fastening surface, and each of the two second clamping assemblies comprises a fastening member fastened to the second fastening surface and a clamping member fastened to the fastening member.

6. The robot claw of claim 1, further comprises a position sensor located at the first fastening surface, and the position sensor is configured for sensing a distance between the position sensor and the workpiece.

7. The robot claw of claim 1, wherein the number of the first clamping assemblies is four, and the four first clamping assemblies are configured at the four edges of the first fastening surface, respectively.

8. The robot claw of claim 7, wherein the number of the elastic assemblies is eight, two of the elastic assemblies are loaded at two opposite ends of each of the four guide rails; when each of the clamping member slides to one end of the guide rails, one elastic assembly elastically resists with the air cylinder to drive the air cylinder with the clamping member to slide towards the other end of the guide rail; when each of the first clamping assemblies slides to the other end of the guide rail, another elastic assembly elastically resists with the air cylinder to drive the air cylinder with the clamping member to slide towards the opposite end of the guide rail.

* * * * *